United States Patent [19]

Blume

[11] 3,962,793

[45] June 15, 1976

[54] METHOD FOR DETERMINING INITIAL VELOCITY FOR A RAPID FIRE GUN

[75] Inventor: Frank R. Blume, Jeffersontown, Ky.

[73] Assignee: The United States of America as represented by the Secretary of the Navy, Washington, D.C.

[22] Filed: Apr. 2, 1975

[21] Appl. No.: 564,231

[52] U.S. Cl. .............................. 33/143 R; 33/169 B
[51] Int. Cl.² ............................................ G01B 5/00
[58] Field of Search ............ 33/1 R, 143 R, 143 M, 33/143 J, 143 K, 169 B, 178 R, 178 B, 147 R; 73/167

[56] References Cited
UNITED STATES PATENTS

| | | | |
|---|---|---|---|
| 1,351,721 | 8/1920 | Eickhoff et al. | 33/163 |
| 2,433,108 | 12/1947 | Foster | 33/147 R |
| 2,544,158 | 3/1951 | Henderson | 33/178 R |
| 2,553,704 | 5/1951 | Eckel | 33/143 R |
| 2,619,727 | 12/1957 | Krohn | 33/169 B |
| 3,225,447 | 12/1965 | Bryant | 33/143 A |
| 3,538,318 | 11/1970 | Clutterbuck et al. | 73/167 |
| 3,670,420 | 6/1972 | Kiewicz et al. | 33/169 B |

*Primary Examiner*—Richard E. Aegerter
*Assistant Examiner*—John W. Shepperd
*Attorney, Agent, or Firm*—R. S. Sciascia; Paul S. Collignon

[57] ABSTRACT

A method for determining initial or muzzle velocity for a rapid fire gun whose barrel becomes eroded with use. A gauge simulating a rotating band of a projectile is inserted into a gun barrel and the depth of penetration is measured to provide a projectile seating dimension. This dimension is converted into a velocity loss value by using an empirically derived chart. This velocity loss value is subtracted from the initial velocity value for a new gun barrel to provide a corrected initial velocity which is used as an input to a computing unit of a gun fire control system.

2 Claims, 6 Drawing Figures

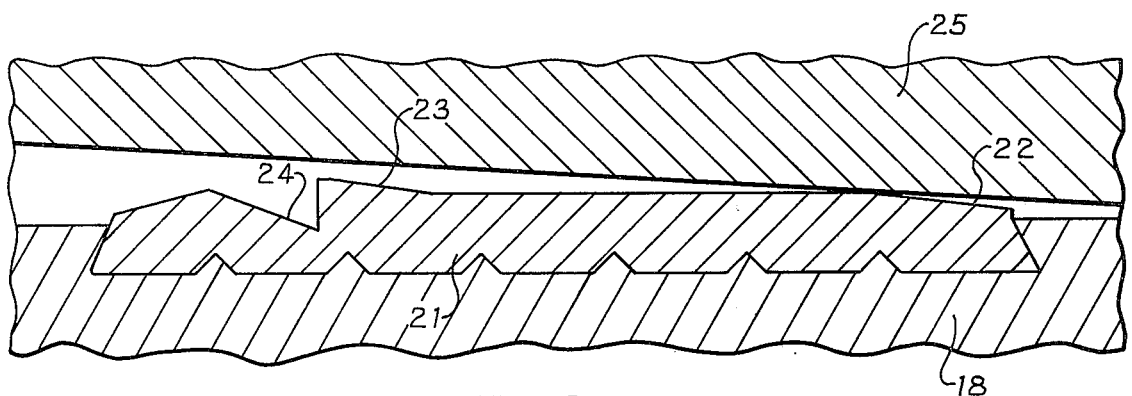
Fig.3
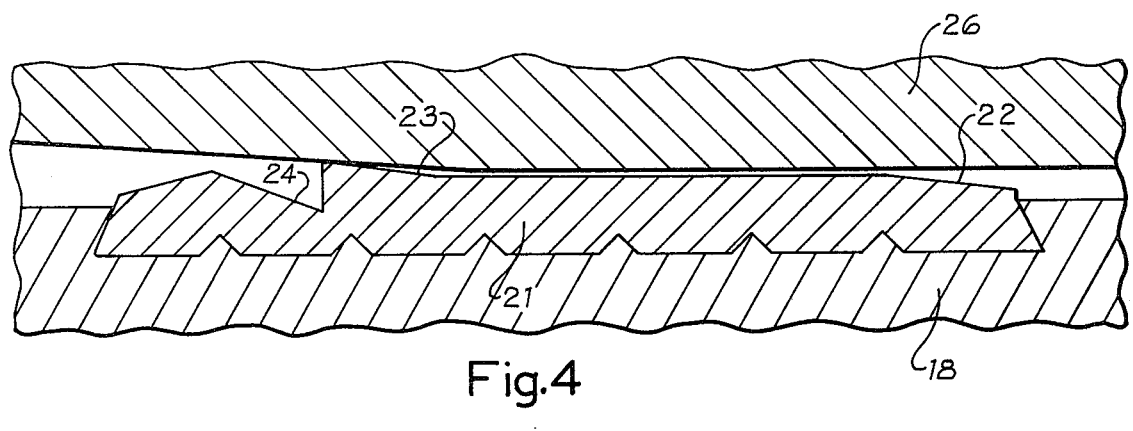
Fig.4
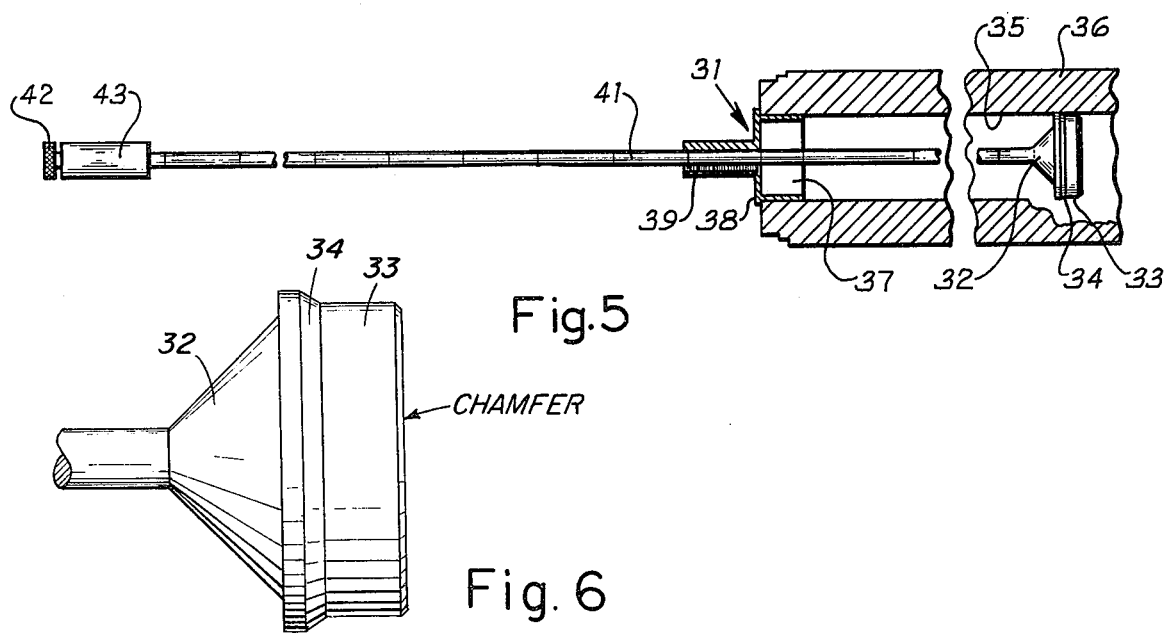
Fig.5
Fig.6

METHOD FOR DETERMINING INITIAL VELOCITY FOR A RAPID FIRE GUN

BACKGROUND OF THE INVENTION

The present invention relates to a method for improving the accuracy of a rapid fire weapon by determining a change in muzzle velocity as the gun barrel is eroded during use.

One value which is required in an equation of a trajectory is initial velocity, which is the velocity with which the projectile is supposed to leave the muzzle of the gun. The term muzzle velocity is synonymous with initial velocity. The initial or muzzle velocity realized from a conventional gun is controlled principally by six factors:

1. the ratio of propellant charge weight to projectile weight;
2. the ratio of total gun volume to chamber volume, i.e., expansion ratio;
3. the thermochemical properties of the propellant;
4. the physical dimensions of the propellant;
5. bore friction; and
6. ignition phenomena.

In the case of a military weapon, such as a 5 inch gun, factors 1, 3, and 4 are held constant, but the expansion ratio varies as the gun becomes worn and the seating position of the projectile changes. This causes the chamber volume to increase, while total gun volume remains constant. Bore friction and ignition system variation introduce a significant amount of random variation into the firing process and accounts for the round-to-round variation within a given ammunition lot.

By way of example, a 5 inch gun presently in use by the military departments is a high performance rapid fire weapon capable of sustained firing at rates up to 40 rounds per minute. A method of muzzle velocity calibration was developed around a bore erosion gauge which is used in association with a velocity loss table. The bore erosion gauge depends upon finding a 5.025 inch diameter in the erosion slope nearest the breechface and the correlation between this location and mean muzzle velocity performance. The original velocity loss table was based upon a series of barrel life tests conducted during the development of the 5 inch gun system. In these tests a standard firing schedule was used consisting of firing 100 rounds at 40 rounds per minute with 20 second pauses after each 20 round burst. This was followed by complete cooling of the barrel. This standard barrel life schedule represented a worst case erosion condition.

Because of the low rate of peace time fleet usage, the inadequacies of the standard calibration technique did not readily become evident. Typically, the gun barrels in the fleet were subjected to only the slow spotted direct fire of shore bombardment training exercises or the very few rounds fired at maximum rate against air targets. There were no sustained rapid firing with attendant hot gun conditions were residual bore temperatures exceed 250° F., and, consequently fleet training exercises represented a best case erosion situation. It later developed that Navy operational units were consistently overshooting their targets during training exercises and the source of error was traced to the inability to establish an accurate muzzle velocity calibration using a bore erosion gauge.

Prior to and during the Viet Nam War, the standard Naval gun propellant in use was a medium flame temperature (2,450–2,650° K.) composition known as PYRO. This propellant, when used in a 5 inch gun led to a very short barrel life (average of 1500 rounds). The demamds for Naval gun fire support in the Viet Nam War quickly demonstrated that such a short barrel life was unacceptable. Accordingly, a new low flame temperature (2,180° K.) propellant known as NACO was developed which extended barrel life by a factor of 4 to 6. This new propellant, however, produced greatly different erosion characteristics and the utility of the erosion was further degraded.

SUMMARY OF THE INVENTION

The present invention provides an improved method for determining initial or muzzle velocity of a gun barrel which has eroded with use. A gauge is inserted into the barrel with the profile of the gauge being designed to conform to the profile of a rotating band of a projectile. Depending upon the severity of the erosion, one of two surfaces on the gauge will contact the lands of a rifled barrel. The depth of penetration is measured and this depth dimension is converted to velocity loss by consulting an emperically derived chart. The velocity loss is subtracted from a given initial velocity for a new barrel to provide a new value for initial or muzzle velocity.

It is therefore a general object of the present invention to provide an accurate and reliable muzzle velocity prediction technique for worn gun barrels.

Other objects, advantages and novel features of the invention will become apparent from the following detailed description of the invention when considered in conjunction with the accompanying drawings.

BRIEF DESCRIPTION OF THE DRAWINGS

FIG. 3 is a partial sectional view showing positioning of a rotating band of a projectile in a new gun barrel;

FIG. 4 is a partial sectional view showing positioning of a rotating band of a projectile in a worn gun barrel;

FIG. 5 is a partial sectional view of a projectile seating gauge within a gun barrel; and FIG. 6 is a view showing a head gauge.

DESCRIPTION OF THE PREFERRED EMBODIMENT

Figure 1:
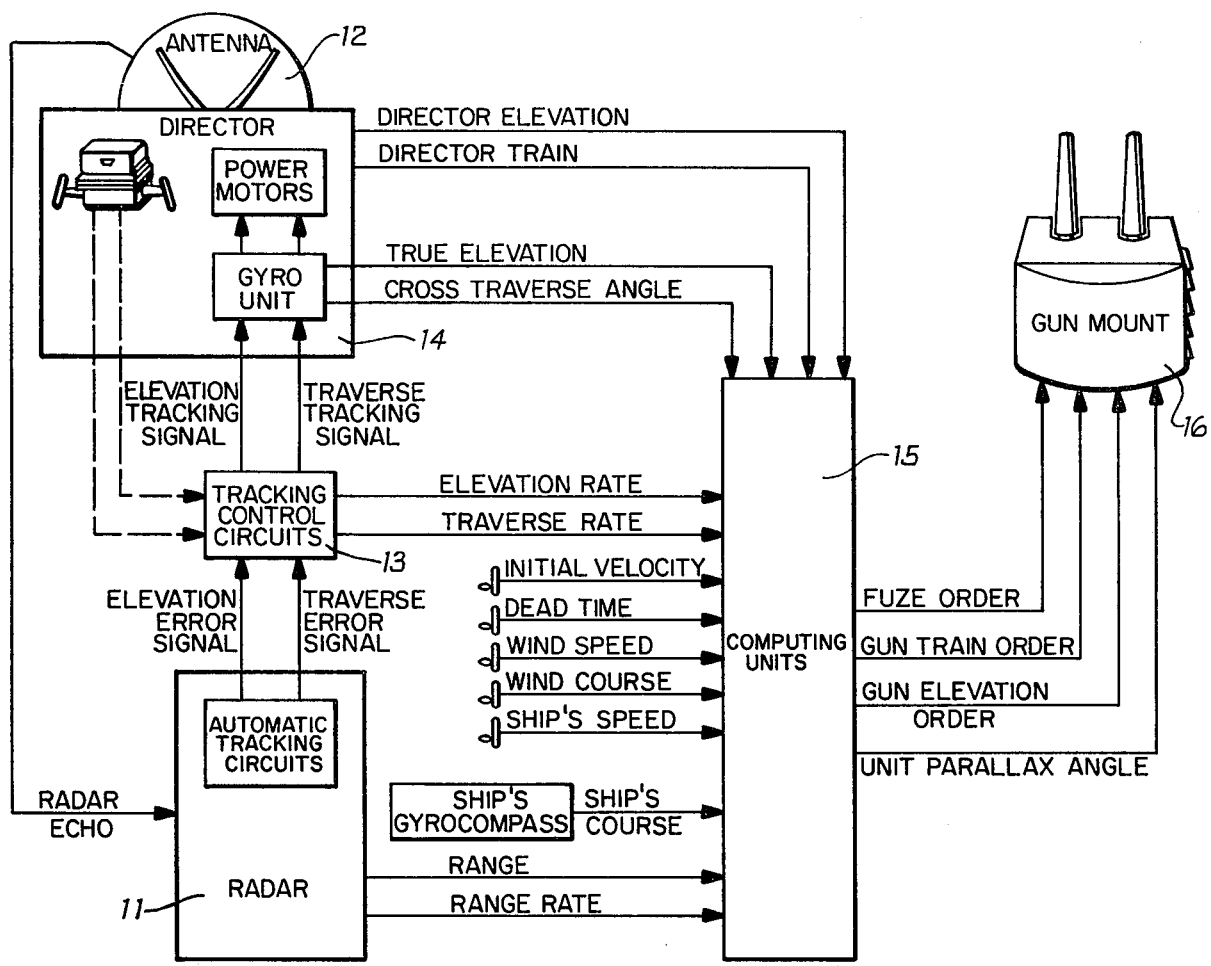
FIG. 1 is a block diagram of a gun fire control system.

Referring first to FIG. 1 of the drawings, there is shown a typical gun fire control system in current use by the military department. The major components of the system are a radar 11, having an antenna 12, tracking control circuits 13, a gun director 14, computing units 15 and a gun mount 16. It can be seen that various inputs are made to the computing units 15, one of which is initial velocity, also referred to as muzzle velocity.

Propelling charges with their containers, primers, projectiles and projectile fuzes are the major components of a complete round of ammunition and the military departments mainly use three types of ammunition, that is, bag, semi-fixed, and fixed. Large guns, such as a 16 inch Naval gun, require large quantities of propellant powder to attain required projectile initial velocity. If the total amount of powder required for a 16 inch gun were placed in a single rigid container, the size and weight would make loading exceedingly difficult and slow. By packing the powder grains in nylon or silk bags, it is possible to divide the charge into units each of which can be expeditiously handled by one man.

Gun ammunition which has its propellant charge in a metal case instead of a bag is called case ammunition and can be either semi-fixed or fixed. In fixed ammunition, the projectile is attached to the casing, as by crimping. The determining factor as to whether ammunition for a certain gun shall be fixed or semi-fixed is the size and weight of a unit which can be handled by one man.

Figure 2:
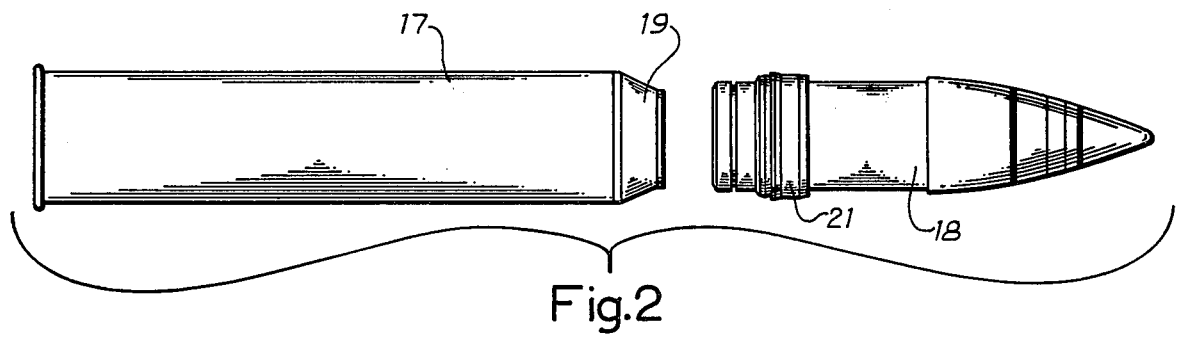
FIG. 2 is a view showing semi-fixed ammunition.

Referring to FIG. 2 of the drawing, there is shown a 5 inch semi-fixed ammunition consisting of a case 17 and projectile 18. While in fixed ammunition, the projectile is the seal for the case, a mouth plug 19 is provided for semi-fixed charges. One such mouth plug 19 is shown and described in U.S. Pat. 3,598,058, entitled, "Cartridge Case Plug For Semifixed Gun Ammunition", which issued Aug. 10, 1971, to Alvin Smith.

The projectile 18 is that part of a round of ammunition which is expelled from the gun by the force of the explosion of the propelling charge. For larger guns, the essential parts of the projectile are the metallic body, the explosive bursting charge and the fuze which sets off that charge. As shown in FIG. 2 of the drawings, the body of projectile 18 is provided with a rotating band 21 which performs three functions. Rotating band 21 seats the bore, positions and centers the rear end of the projectile and imparts rotation to the projectile. A secondary function of the rotating band is to hold the projectile in its proper position in the gun after loading and ramming, and to ensure that the projectile will not slip back when the gun is elevated. The rotating band has considerable effect on muzzle velocity, range, accuracy, and the life of the gun. Rotating bands are usually made of fine copper and Navy projectiles generally have rotating bands about one-third caliber in width. The forward edge of the band is slightly conical and, as best shown in FIG. 3 of the drawings, cone 22, during loading, wedges into a seat at the origin of the rifling and holds the projectile in place during loading and elevating. The central portion of the rotating band is cylindrical and of a slightly greater diameter than that of the bore plus the depth of the rifling. This portion is sometimes divided by circumferential grooves, called cannelures, which provide space into which displaced copper may be wiped. In the after part of the band, separate-loadng projectiles have a raised lip 23 followed by an especially deep cannelure 24, as shown in FIGS. 3 and 4 of the drawings. Lip 23 serves to ensure a good gas check and also to prevent over-ramming in a badly worn or eroded gun.

Referring now to FIG. 3 of the drawings, there is shown a projectile 18 which has been rammed into a new gun barrel 25. Cone portion 22 of rotating band 21 is in contact with the chamber wall of barrel 25. FIG. 4 of the drawing shows a gun barrel 26, which has become eroded with use. It can be seen that, after ramming, lip 23 of rotating band 21 is in contact with the chamber wall of gun barrel 26. As a gun barrel becomes progressively worn, the further a projectile will move into the barrel and the velocity loss becomes progressively greater.

Referring now to FIG. 5 of the drawings, there is shown a projectile seating gauge 31 having a head gauge 32 which simulates the engagement of a rotating band of a projectile. Head gauge 32 has a cylindrical portion 33 and an outwardly extending conical lip portion 34 adjacent cylindrical portion 33. In a new gun barrel or in a barrel not severely worn, cylindrical portion 33 of head gauge 32 will engage the chamber wall 35 of barrel 36. In a badly worn gun barrel, conical lip portion 34 will engage the chamber wall 35 of barrel 36. The engagement of conical lip portion 34 with chamber wall 35 simulates the engagement of lip 23 on rotating band 21 with the chamber wall 35 of a barrel.

Gauge 31 is supported and positioned in barrel 36 by a support 37 that has a cylindrical diameter which slidably fits into the chamber of gun barrel 36. A lip 38 on support 37 positions support 37 so that a scale 39 which is attached to support 37 is properly oriented the same each time gauge 31 is used. Scale 39 has markings showing inches and fractions thereof and a rod 41, which is slidably positioned in support 37 and attached to head gauge 32, has markings every 5 inches. The combination of the markings on rod 41 with scale 39 serves as a vernier scale to measure the depth of penetration of head gauge 32 into barrel 36. A knob 42 is threadedly attached to the end of rod 41 and a back-out collar 43 is slidably mounted on rod 41 and engageable with collar 43 to facilitate removal of gauge 31 from a gun barrel.

TABLE I below is a conversion chart for a 5 inch gun firing a 70 pound projectile using power designated SPCF or SPD. It can readily be seen that as projectile seating distance increases, velocity loss increases and, if no correction is made, the velocity loss will create errors that can result in a miss distance of several miles.

TABLE I

VELOCITY LOSS V. PROJECTILE SEATING DISTANCE

| Gun: | 5"/54 | | | | | | | |
|---|---|---|---|---|---|---|---|---|
| Projectile Weight: | 70 lbs. | Nominal Velocity: | 2650 f/s | | | | | |
| Propellant Charge: | Full | Propellant Index: | SPCF, SPD | | | | | |

| Projectile Seating Distance (inches) | 0 | .1 | .2 | .3 | .4 | .5 | .6 | .7 | .8 | .9 |
|---|---|---|---|---|---|---|---|---|---|---|
| 35 | — | — | — | 0 | 0 | 0 | 0 | 0 | 13 | 30 |
| 36 | 48 | 65 | 72 | 74 | 75 | 77 | 78 | 80 | 82 | 83 |
| 37 | 85 | 87 | 88 | 90 | 92 | 93 | 95 | 96 | 98 | 100 |
| 38 | 101 | 103 | 105 | 106 | 108 | 110 | 111 | 113 | 115 | 116 |
| 39 | 118 | 119 | 121 | 123 | 124 | 126 | 127 | 129 | 131 | 133 |
| 40 | 134 | 136 | 138 | 139 | 141 | 142 | 144 | 146 | 147 | 149 |
| 41 | 151 | 152 | 154 | 156 | 157 | 159 | 161 | 162 | 164 | 165 |
| 42 | 167 | 169 | 170 | 172 | 174 | 175 | 177 | 179 | 180 | 182 |
| 43 | 184 | 185 | 187 | 188 | 190 | 192 | 193 | 195 | 197 | 198 |
| 44 | 200 | 202 | 203 | 205 | 207 | 208 | 210 | 211 | 213 | 214 |

TABLE I-continued
VELOCITY LOSS V. PROJECTILE SEATING DISTANCE

| 45 | 216 | 218 | 220 | 221 | 223 | 225 | 226 | 228 | 229 | 231 |
| 46 | 233 | 234 | 236 | 238 | 239 | 241 | 243 | 244 | 246 | 248 |
| 47 | 249 | 251 | 252 | 254 | 256 | 257 | 259 | 261 | 262 | 264 |
| 48 | 266 | 267 | 269 | 271 | 272 | 274 | 275 | 277 | 279 | 280 |
| 49 | 282 | 284 | 285 | 287 | 289 | 290 | 292 | 294 | 295 | 297 |

The above TABLE I was derived emperically by firing 18 rounds each day in each of 14 gun barrels. Measurements for projectile seating distance was taken each day prior to firing and muzzle velocity measurements were made using induction coils. Velocity checks were also made using a doppler radar velocimeter.

Assuming a 5 inch gun is using an SPCF propellant, a 70 lb. projectile would have an initial or muzzle velocity of 2650 feet per second and this value would be used as an input velocity to computing units 15 in the gun fire control system shown in FIG. 1 of the drawings. Assuming now that the barrel has eroded and gauge 31 is used and a projectile seating distance of 36.6 inches is read on scale 39. Referring to TABLE I, going down the left-hand column to 36 and then across to 0.6, a reading of 78 f/s is obtained. The new initial velocity to be used in the computing units 15 is:

$$2650 \text{ f/s} - 78 \text{ f/s} = 2572 \text{ f/s}.$$

It can thus be seen that the present invention provides an improved method for determining initial or muzzle velocity for a gun whose barrel becomes eroded with use.

Obviously many modifications and variations of the present invention are possible in the light of the above teachings. It is therefore to be understood that within the scope of the appended claims the invention may be practiced otherwise than as specifically described.

I claim:

1. A plug gauge for determining a corrected muzzle velocity for a gun barrel which fires a projectile having a rotating band thereon comprising,
   a support slidably engageable with the breach of a gun barrel, said support having a cylindrical portion slightly smaller in diameter than the bore of a gun barrel to be gauged and having an annular lip adjacent said cylindrical portion larger in diameter than the bore of a gun barrel to be gauged whereby said annular lip limits the depth of insertion of said support into a gun barrel to be gauged,
   a centrally located bore in said support,
   a rod slidably mounted in said centrally located bore in said support,
   a gauge head attached to one end of said rod, said gauge head having a front chamfer, a cylindrical portion thereon, and an outwardly extendng conical lip portion adjacent said cylindrical portion, said cylindrical portion and said conical lip portion simulating a rotating band on a projectile to be fired in said gun barrel, and
   means for measuring the depth of penetration of said gauge head into the bore of a gun barrel, said depth being determined by the engagement of either the chamfer, the cylindrical portion, or the conical portion of said gauge head with the chamber wall of said gun barrel.

2. A plug gauge for determining a corrected muzzle velocity for a gun barrel as set forth in claim 1 wherein said means for measuring the depth of penetration of said gauge head comprises a scale attached to said cylindrical support and gradation markings on said rod.

* * * * *